United States Patent
Suman (10) Patent No.: US 6,844,392 B2
(45) Date of Patent: Jan. 18, 2005

(54) ABRADABLE DRY POWDER COATINGS, METHODS FOR MAKING AND COATING, AND COATED ARTICLES THEREFROM

(76) Inventor: Andrew W. Suman, 3097 Lansdowne Rd., Waterford, MI (US) 48329

(*) Notice: Subject to any disclaimer, the term of this patent is extended or adjusted under 35 U.S.C. 154(b) by 143 days.

(21) Appl. No.: 10/258,934

(22) PCT Filed: Aug. 29, 2001

(86) PCT No.: PCT/US01/26812
§ 371 (c)(1),
(2), (4) Date: Oct. 29, 2002

(87) PCT Pub. No.: WO02/18483
PCT Pub. Date: Mar. 7, 2002

(65) Prior Publication Data
US 2004/0111975 A1 Jun. 17, 2004

Related U.S. Application Data

(60) Provisional application No. 60/228,653, filed on Aug. 29, 2000.

(51) Int. Cl.$^7$ ................................................. C08K 3/04
(52) U.S. Cl. ................... 524/588; 523/440; 523/468; 428/325; 428/326; 428/327; 428/331; 524/492; 524/495; 524/497; 524/13; 524/14; 524/404; 524/406; 524/445; 524/593; 524/554; 524/571; 524/582; 524/584; 524/556; 524/590; 524/604; 524/601; 524/607; 524/611; 525/934; 277/415
(58) Field of Search ................................. 524/588, 439, 524/492, 404, 413, 13, 14, 430, 423, 420, 556, 589, 594, 579, 571, 582, 583, 584, 604, 605, 606, 611, 593; 523/443, 440, 466, 445, 458, 457, 400

(56) References Cited

U.S. PATENT DOCUMENTS

| | | | | |
|---|---|---|---|---|
| 3,873,475 A | * | 3/1975 | Pechacek et al. | ............ 523/509 |
| 4,021,504 A | * | 5/1977 | Conrad et al. | .............. 525/119 |
| 5,196,471 A | * | 3/1993 | Rangaswamy et al. | ..... 524/406 |
| 5,925,698 A | * | 7/1999 | Steckel | ........................ 524/322 |
| 5,948,856 A | * | 9/1999 | Juen et al. | ................... 524/847 |
| 5,975,874 A | * | 11/1999 | Daly et al. | ................... 425/204 |
| 6,217,252 B1 | | 4/2001 | Tolliver et al. | |
| 6,334,617 B1 | * | 1/2002 | Putnam et al. | .............. 277/415 |
| 6,352,264 B1 | * | 3/2002 | Dalzell et al. | .............. 277/415 |

* cited by examiner

*Primary Examiner*—Margaret G. Moore
(74) *Attorney, Agent, or Firm*—Lynn E. Cargill (57) ABSTRACT

An abradable dry powder coating (22) composition for coating onto a surface (12) for subsequent curing to form into an abradable coating, including a powder (16) formed of uncured thermoset resin with at least 15 volume percent filler, wherein the filler does not substantially melt below the cure temperature of the resin. Method for making the coating composition includes melt-mixing the thermoset resin with at least 15 volume percent of filler, cooling the resulting mass composite, and then breaking the cooled mass composite into powder particles (16). Method of coating an article with an abradable coating includes applying the dry composite powder with the filler therein onto a substrate and curing the dry powder composition, preferably by electrostatic coating. An article is also disclosed which is coated with the abradable coating.

40 Claims, 3 Drawing Sheets

ABRADABLE DRY POWDER COATINGS, METHODS FOR MAKING AND COATING, AND COATED ARTICLES THEREFROM

CROSS REFERENCES TO RELATED APPLICATIONS

This patent application is a 371 of PCT/US01/26812 filed Aug. 29, 2001 which claims the benefit of prior filed co-pending U.S. Provisional Patent Application No. 60/228,653 filed on Aug. 29, 2000, which Provisional Patent Application is incorporated by reference herein.

BACKGROUND OF THE INVENTION

I. Field of the Invention

The present invention relates generally to dry powder compositions for forming abradable coatings, methods for making the compositions, and methods for coating articles with the compositions, and the coated articles themselves, such as pump components.

II. Description of the Related Art

In fluid transferring devices, e.g., pumps or compressors, the operation relies on the relative movement of internal components to pump liquids or compress gases. For the highest operating efficiency of such devices, it is necessary to minimize leakage between the movable components without having contact between the components. In some devices it is also advantageous to minimize friction between the movable components and/or between the components and the fluid being transferred. Abradable coatings on the working surfaces of the pumps grind themselves into nearly perfect fitting surfaces when the pump is first operated. These conventional abradable coatings are made of liquid materials which are sprayed or painted onto the working surfaces. Alternatively, the working surfaces can be dipped into the liquid abradable coating composition. The liquid coating may even be electrostatically painted on.

However, these prior art liquid compositions have inherent problems, including cost for excessive material, environmental concerns arising from the use of the solvents, and the inability to recycle and re-use any overspray which is surely generated during any spraying or electrostatic applications. Dipping and roller painting may not generate much overspray, but they certainly generate a lot of toxic solvent fumes.

One example of the prior art is U.S. Pat. No. 5,554,020 to Rao et al. which discloses providing a liquid abradable coating on both contacting surfaces in a gas compressor. Before start up, the coated contacting surfaces have an interfering fit; but upon start up, the coatings on the two contacting surfaces abrade and grind against each other to a substantially zero clearance.

Rao et al. use either water-based or solvent-based resin formulations to coat the desired components and subsequently flash off the solvent or water and cure the resin. Rao et al.'s formulations include the water or evaporative solvent along with certain solid lubricants, a thermoset resin selected from epoxy, polyamide, or polyaryl sulphone, and a polymerizing catalyst. Rao et al. describe that the coating may be applied by (i) electrostatic or air atomized spray/or dip process or (ii) a smooth sponge roller. In the case of a spray process, a multi-layer coating is taught to be desirable.

Although Rao et al. present the above-described methods for achieving close clearances on pump components, their methods are not without problems and undesirably high manufacturing costs. For instance, when solvent-based formulations are used, removal, containment, and special handling of the solvent is required. Removal of the solvent (or volatile organic compound) from the coatings—which is completed before the curing process—requires additional heat, time, and handling equipment. The volatile organic compound requires additional care in handling for the safety and health of the operators and the environment. In addition, there is typically significant shutdown time necessary for cleaning and maintenance of solvent-processing equipment. Aside from the problems with processing with solvents, solvent-based materials also create unique problems and additional cost when transporting the materials.

Although the water-based systems are environmentally more favorable, there remains the additional cost and time of evaporating and handling the water from the coatings and the shutdown time for cleaning and maintenance of the equipment. Furthermore, not all resins can be formulated into water-based systems, so the types of resins available to use with water-based systems are limited.

Another disadvantage of spray coating liquid-based. formulations is that it is not practical to recycle any overspray. Reclaimed overspray would require an inordinate amount of re-formulation to adjust its viscosity in order to achieve consistent coating results.

Therefore, even in light of the Rao et al. patent, there is a need for improved abradable coatings, methods of making the coatings, methods of coating articles with abradable coatings, and the coated articles themselves. It would be advantageous if the improved coatings were easy to apply, cost effective, energy-wise, used relatively inexpensive and simple equipment, and were environmentally favorable. It would also be advantageous if the composition for forming the abradable coatings was recyclable, to reduce loss during the coating process. Yet another advantage would be realized if any coating thickness can be achieved in one layer, thus, not requiring a multi-layer coating. Still a further advantage would be realized if the lubricity of the coating could be controlled to best meet different applications.

Still further advantages would be realized if an improved abradable coating were made available, e.g., one which is more easily abraded and/or one in which less material is required, thereby saving cost.

SUMMARY OF THE INVENTION

In accordance with the present invention, an abradable dry powder coating composition (22) for coating onto a surface (12) for subsequent curing to form into an abradable dry powder coating, includes a powder (16) formed of uncured thermoset resin with at least 15 volume percent filler wherein the filler does not substantially melt at or below the cure temperature of the resin. Therefore, once the resin has been cured and melted downwardly onto the surface, the filler particles project upwardly through the melted resin and act as little tiny pieces of sandpaper, which forms the abradable portion of the coating. When both contacting surfaces have the abradable coating thereon, and the pump is started, these abradable pieces scrape against one another and form a smooth surface which does not allow leakage therepast.

Another aspect of the present invention includes the method for making the abradable dry powder coating composition (22) which includes melt-mixing the thermoset resin with at least 15 volume percent of filler, cooling the resulting mass composite, and then breaking the cooled mass composite into tiny powder particles (16). This method produces a homogeneous powder particle composition suitable for use with the present invention.

Yet another aspect of the present invention is the practice of a method for coating an article with an abradable coating made in accordance with the present invention which includes applying the dry composite powder coating composition (22) having the filler therein, onto a substrate and curing the dry powder composition, preferably by electrostatic coating. Although any suitable method for applying dry powder coating composition to a substrate may be utilized, the least waste is experienced when utilizing the electrostatic dry powder coating method.

Finally, the last aspect of the present invention includes articles coated with the abradable dry powder coating composition of the present invention. The most applicable articles are those with working contacting surfaces, such as the rotors in pumps and turbochargers.

Other advantages of the present invention will be readily appreciated as the same becomes better understood after reading the subsequent description taken in conjunction with the appendant drawings.

DESCRIPTION OF THE PREFERRED EMBODIMENT(S)

The present invention generally entails composite dry powder compositions for forming abradable dry powder coatings, methods for making the composite powder compositions and coated articles, and articles coated with the composite powder compositions. The abradable coatings formed from the composite powder compositions are especially useful for coating a component or components in a device in which the components are movable relative to each other and a minimum clearance between the components is desired. The composite powder composition may also be formulated to provide self-lubrication. To achieve the minimum clearance and optionally, lubricity, the component(s) is coated with the composite powder composition, which is subsequently cured. The coating is applied to a thickness such that the movable components contact each other during initial operation of the device. Then, during initial use of the device, the coating(s) is worn down until an essentially zero clearance during operation is achieved.

I. The Coating Composition

In its simplest form, the composite powder composition is a dry powder which contains uncured thermoset resin and filler. The term "dry" is used to mean without evaporative carriers, such as volatile organic compounds (VOCs) or water as carriers for the powders. Typical prior art volatile organic compounds that were used as carriers are those that have a boiling point of less than 100° C. Examples of such VOCs are xylene, methyl ethyl ketone, and acetone.

The uncured thermoset resin may be a resin system which includes the resin polymer and the hardener (if needed). The hardener or other curing initiator induces crosslinking of the resin polymer within a specific temperature range, which provides strength and chemical and thermal resistance to the polymer matrix in resultant coating. The type of thermoset resin employed is not limited. For example, the thermoset resin type may be acrylic, polyester, epoxy, allyl, melamine formaldehyde, phenolic, polybutadiene, polycarbonate, polydicyclopentadiene, polyamide, polyurethane, silicone, and combinations of these resin types. The thermoset resin has a curing temperature which is recommended by the manufacturer. Typical desirable powder coating resins begin to soften and flow around 200° F. and require a cure temperature of about 250° F. to 550° F. for up to about 30 minutes for completion of the crosslinking reaction.

An exception to heat-curing resins, UV-curable resins may be used, as these resins cure upon exposure to UV light. In cases when heat is not desirable or required to cure the resin, it is still preferred to heat the coating to a temperature in which the surrounding resin flows sufficiently to wet the surface of the substrate to improve adhesion. The fillers used with these types of resins are preferably substantially non-flowing at the melt temperature of the resin.

The filler may be formed of a material which does not melt substantially at the cure temperature of the resin and is employed in an amount of at least 15 volume percent based on the volume of the resultant composite powder composition as cured on the part. Once the composite powder composition is applied to the desired surface, the amount of filler, along with the fact that the filler does not substantially flow at the cure temperature, allows the composite powder composition to maintain much of its shape and position on the coated surface even during the curing process. The term "does not substantially flow at the cure temperature of the resin" or "which melts above the cure temperature of the resin" is used to mean that the filler preferably does not melt or flow at the cure temperature of the resin such that the filler does not contribute significantly to any change in the shape or position of the coating during the curing process. The level and type of filler also effectively raises the viscosity of the composite particles at the cure temperature so that wetting and sintering of the particles is severely limited as compared to typical decorative and other protective powder coatings. Surface roughness and porosity are present in the cured coating structure of the present invention, both of which enhance abradability.

As mentioned, the composite powder composition performs best when the filler is used in an amount of at least 15 volume percent based on the volume of the composite powder composition. The preferred composite powder compositions employ at least about 25 volume percent based on the volume of the resultant composite powder composition.

Preferred composite powder compositions employ at most about 45 volume percent filler, and more preferred compositions employ about 35 volume percent filler, based on the volume of the resultant composite powder composition.

The filler may be selected from any of a variety of materials, including, but not limited to, metals, minerals, mineral substances, ceramics, polymers (including fluoropolymers), silicon dioxide, titanium dioxide, gypsum, silicate minerals (such as talc and aluminosilicates), graphite, diamond, molybdenum disulfide, fluorides such as calcium fluoride, magnesium fluoride and barium fluoride, clays, dirt, wood, ash, pigments, magnetic materials, phosphorescent materials, cured resin systems, cured composite powder compositions made according to the present invention, and mixtures thereof. Examples of clays which are suitable for the present invention include kaolin, mullite, montmorillonite, and bentonite. Examples of ceramics which are suitable for the present invention include boron nitride, boron carbide, mullite, tungsten carbide, silicon nitride and titanium carbide. Many fillers are available from Atlantic Equipment Engineers, a Division of Micron Metals, Inc., Bergenfield, N.J. Other suitable minerals may be selected from those having a MOH's hardness of between about 0 and 10, which includes from carnotite (with a hardness of 0) up to diamond (with a hardness of 10). Such an entire list of minerals are those available from Atlantic Equipment Engineers, described above, or any other supplier of minerals and mineral substances.

For some applications, a blend of fillers, such as a blend of graphite and clay, is preferred. Especially suitable filler compositions include from about 30 to about 40 volume percent clay and from about 60 to about 70 volume percent graphite based on the resulting filler content. Other combinations are also possible.

Fillers such as graphite, fluorides, talc, boron nitride, and molybdenum disulfide possess lubricating properties and, therefore, when used, provide lubrication properties to the coatings.

In addition, using cured resin systems (which may include cured composite powder compositions of the present invention) as the filler material offers some unique advantages. One advantage of using cured resin systems is the opportunity to recycle "lost" material (i.e., material that is scrapped from previous coating operations). Another advantage of using cured resin systems as the filler material is that abradability of the coating can be adjusted without significantly altering the performance of the powder during electrostatic application.

The composite powder compositions of the present invention may also contain polymers or polymer waxes. The addition of polymer waxes renders the final product softer, more easily abradable, and, therefore, less filler may be needed. Suitable polymers may include any uncurable thermoset resin or thermoplastic such as polyethylene, polypropylene, fluoropolymers, co-polymers and any combination thereof. Any monomer that will not react with the hardener may be suitable to add softness, yielding a more abradable coating, so long as it will not crosslink and become hard. Polymer waxes may also improve the performance of the composite powder during application. Various polymer waxes may be used, e.g., fluoropolymer wax, polyethylene wax and polypropylene wax. Polymer waxes are typically added at levels of from about 1 to about 20 volume percent based on the volume of the composite powder composition.

II. Method of Making the Powder Composition

Another aspect of the present invention includes a method of making the composite powder composition, which includes the steps of (a) mixing filler and resin particles in the amounts according to the present invention to form a dry mixture; (b) pulverizing the mixture to obtain a more uniform particle size and dispersion in the mixture; (c) consolidating the mixture particles into small units; (d) admixing the hardener (if needed) with the small units of resin and filler; (e) melt-mixing the mixture of the resin, hardener, and filler to form a mass composite; (f) cooling the mass composite; and (g) breaking the cooled mass composite into powder particles, thereby forming the composite powder composition. Fluidizing agents, such as fumed amorphous silica or aluminum oxide, may be added to the mixture to improve fluidization during application, reduce clogging in electrostatic spray equipment, and reduce clumping during storage.

Additional solid powders can be blended in with the composite powder before or during application. However, this procedure is undesirable for powders which are applied using overspray recycling systems, because segregation can occur during the spraying and reclaim steps, thereby causing the composition to change as the recycling continues. Recycling blends usually require monitoring and maintenance of the proper mixture to maintain a consistent coating.

The mixing of the filler and resin particles may be performed using any suitable mixing equipment, such as tumbler mixers (e.g., cement mixers), medium or high intensity mixers, ball mills, attrition mills, and the like.

The pulverizing step may be performed either before, after, or during the above-described mixing step and is to form more similar particle size distributions of the various components, to separate agglomerated ingredients, and provide a more uniform dispersion of all the ingredients. The pulverizing step may be performed with any suitable grinding equipment, such as a hammer mill or ball mill or a high intensity mixer. Good results have been achieved when the resin and filler are ground to less than 2000 um and 200 um, respectively.

The third step, the consolidating step, is performed to maintain the distribution of resin and filler and to improve throughput through a melt mixer (typically an extruder). The higher throughput is achieved by avoiding fluidization of the mixture in the extruder. Eliminating fluidization results in better mixing and, of course, faster production rates. The consolidating step forms small units which are desirably similar in size to the hardener particles, which are preferably admixed with; the resin and filler after the consolidating step. The similarly-sized hardener and units of resin and filler are designed to prevent segregation of any one material, especially in the feed hopper of the melt mixer, and maintain good distribution of all ingredients.

Roll compacting or pressing is a suitable technique for performing the consolidation step. Good results are achieved when, some compacted units (from a previous run) and some powder mixture (e.g., about a 50:50 volume-to-volume mixture powder to compacted units) are fed into a roll compactor.

The consolidation step may also be achieved by heating the pulverized mixture to the softening temperature of the resin and/or polymer and/or polymer wax particles, allowing sufficient time for wetting and sintering to occur, thus, forming a partially or fully-sintered bulk mass. Thereafter, the bulk mass would be broken into small units which are suitable for mixing with the hardener and feeding into the melt mixer.

The consolidation step may also be achieved by first making a paste-like mixture of the resin and filler in water or other liquid, forming small units of the paste-like mixture, and drying the water or liquid from the small units.

The hardener (if needed) may be added to the resin and filler before consolidating, but as mentioned above, it is preferred to add the hardener after consolidation. Sometimes less hardener is required for the same resin hardness when the hardener is added after the consolidating step. It is suspected that when the hardener is added before the consolidation step, the hardener partially reacts with the resin due to the frictional heat and pressure of the consolidation step.

After forming units from the consolidation step, if it is necessary, the small units may be broken to more closely meet the particle size of the hardener. Once again, any suitable grinding, comminuting or granulating equipment may be used.

The resin/filler/hardener mixture is then fed through a melt-mixer (e.g., an extruder) to more intimately mix the components and to form a mass composite.

Alternative to the consolidation step, or in addition thereto, the melt mixer or extruder may be operated under vacuum to limit the fluidizing and segregation of the filler particles. Yet another alternative way to limit the fluidizing and segregation of the filler in the extruder is to wet the feed with water, then extrude the ingredients, wet, damp, or after drying of the feed. Still another method is to extrude the resin with a smaller amount of filler, granulate the extruded material, and repeat extrusion of the granulated material, with each extrusion adding more filler. With this method, it may be preferable to add the hardener before the last extrusion cycle so that crosslinking is minimized during extrusion.

The physical properties of the mass composite exiting the melt-mixer depends on the composition. However, it is often soft, deformable, and tacky. Upon exiting the melt-mixer, the mass composite is cooled to avoid reaction between the resin and the hardener. The cooling may be accomplished by chilled rolls, forced air cooling, or submersion in water, among other suitable techniques.

The cooled mass composite is then comminuted to form the composite powder composition. The comminuting may be performed by an air classifier mill or other type of mill, and fumed silica may be added before, during or after final comminution to improve the performance of the powder during certain application methods. Typically, the comminuting is performed until the particle size is less than 100 $\mu$m, but the particle size may be larger, if desired.

The above-described method of making the composite powder composition of the present invention may be simpler than that which is discussed above. For example, the mixing, pulverizing, and consolidating may not be required if the resin, filler, and hardener are supplied having similar particle sizes, thereby limiting segregation. If this is the case or if otherwise desired, the method of making the composite powder composition of the present invention may include (a) melt-mixing an evaporative-carrier-free mixture of the resin and at least 15 volume percent of the filler, based on volume of the composite powder composition, to form a mass composite, (b) cooling the mass composite; and (c) breaking the cooled mass composite into powder particles, thereby forming the composite powder composition.

Although the above-described method of making the composite powder composition is the preferred method, the composite powder composition may also be made by any other suitable method, including wet or dry milling the raw materials together. In this method, attrition mills or ball mills, etc., may be used. In the case of wet milling, the liquid would be removed from the composite powder composition prior to its application to a surface. However, quality of the product and throughput are typically improved with the melt-mixing procedure described above.

Once the composite powder composition has been made, it may be applied to the desired surface. The substrate may be formed of any material so long as that material withstands the cure temperature of the resin. Typically, the substrates are formed of iron, steel, aluminum alloys, magnesium alloys, titanium alloys, copper alloys, ceramic, polymeric, or composite materials. When electrostatic spraying is used to coat the substrate and the substrate is formed of a non-conductive material, the substrate may be coated first with a conductive primer or preheated before application.

The surface should be clean, and phosphate or chrome conversion pretreatments may be used. Other surface preparations and sealers may also be applied to the surface prior to coating with the composite powder composition. Grit blasting, anodizing and other preparation steps may also be desirable prior to coating the substrates.

III. Methods of Coating

Regarding coating methods, different modes of application may be used, e.g., (a) electrostatic spraying, (b) dipping hot surfaces into a fluidized bed, (c) dispersing the powder into an evaporative carrier to form a slurry and applying the slurry by spraying, dipping, rolling, screen printing, or film transferring, (d) pressing a tape or monolithic body of the powder onto a surface, (e) flame spraying, and (f) vacuum deposition. Many of these methods may be used to apply the coating on cold or hot surfaces. In regards to application method (c) described above, U.S. Pat. No. 5,965,213 dated Oct. 12, 1999, assigned to BASF COATINGS AG, is incorporated herein by reference to teach some techniques of coating with a slurry.

When coating with electrostatic powder coating equipment, the resistivity of the composite powder material and the particle size distribution of the composite powder material have a strong influence on the thickness distribution of coating on different areas of the substrate. Each filler and resin component individually contributes to the resistivity of the composite particles, as does the particle size distribution. Proper balance of high and low resistivity fillers, resins, polymer waxes, polymers and particle size distribution will provide the best thickness distribution on a particular part, such as a pump rotor. Application equipment parameters such as gun type, gun tip type, voltage, booth air flow, powder feed rate, and atomizing air also affect the thickness distribution of coating on a substrate. The deposition rate is also affected by the coating material and process parameters mentioned above.

The coating may be applied to basically any thickness. Typical coating thicknesses range from 20 to 500 $\mu$m after one application. Although multiple coatings are usually not necessary, multiple coatings may be applied, if desired. When applying multiple coatings, each layer may or may not be cured prior to applying the following layer, depending on the desired result. In addition, it may be desirable to have multiple thin layers of coatings which could yield various gradient coatings, either thickness gradient or compositional gradient. A coating having a thickness gradient may be thin in one area on the surface and gradually thicken toward another area on the surface. A coating having a compositional gradient would change in composition from the interior of the coating to the exterior of the coating. Alternatively, numerous layers may exhibit a gradient coating which might include a softer layer under a harder layer such that the harder layer could make a nice "first cut" when the machine having the abradable coating incorporated therein first starts up. For example, the uppermost layer(s) may include WC or TiC ceramic filler, in order to be a powerful grinder. Then, the softer filler in an inner layer could include graphite filler to act as a fine polisher after the "rough" polishing action of the ceramic-filled upper layer.

When the coating has been applied to hot surfaces, additional heat treatment may not be necessary. When the method applies the coating onto cold surfaces, it is necessary to thermally treat the coating to cure the resin and provide wetting and bonding to the surface. After the coating is heated enough to wet the substrate, additional heat or UV radiation is required to cure the resin for strength and chemical and thermal stability.

Typical heating methods include convective heating, radiant heating, infrared heating, and inductive heating. When the resin employed is UV-curable, the coating may be heated just enough to melt the resin and, thereafter, is exposed to UV light to initiate crosslinking of the resin.

The substrate and coating must reach the cure temperature of the resin for the minimum period of time recommended by the manufacturer in order to achieve good adhesion and cure. However, the thermal history (temperature vs. time) may be adjusted to achieve desired product properties.

The cured resin/filler matrix of the resultant coating is formed of cured resin and at least 15 volume percent filler based on the volume of the resin/filler matrix, wherein the filler is formed of a material which melts above the cure temperature of the resin. Typically, when dry composite powder composition is applied and cured, the coating exhibits more porosity and roughness than coatings applied from an evaporative carrier and/or having less filler. Since the filler does not flow at the cure temperature of the resin, much of the coating maintains the shape as it was originally coated. The filler limits the wetting, sintering, and spreading of the powder particles during curing because the filler increases the viscosity of the coating at the cure temperature. In addition, the level of the filler renders the coating more easily abraded (i.e. weaker).

Figure 1:
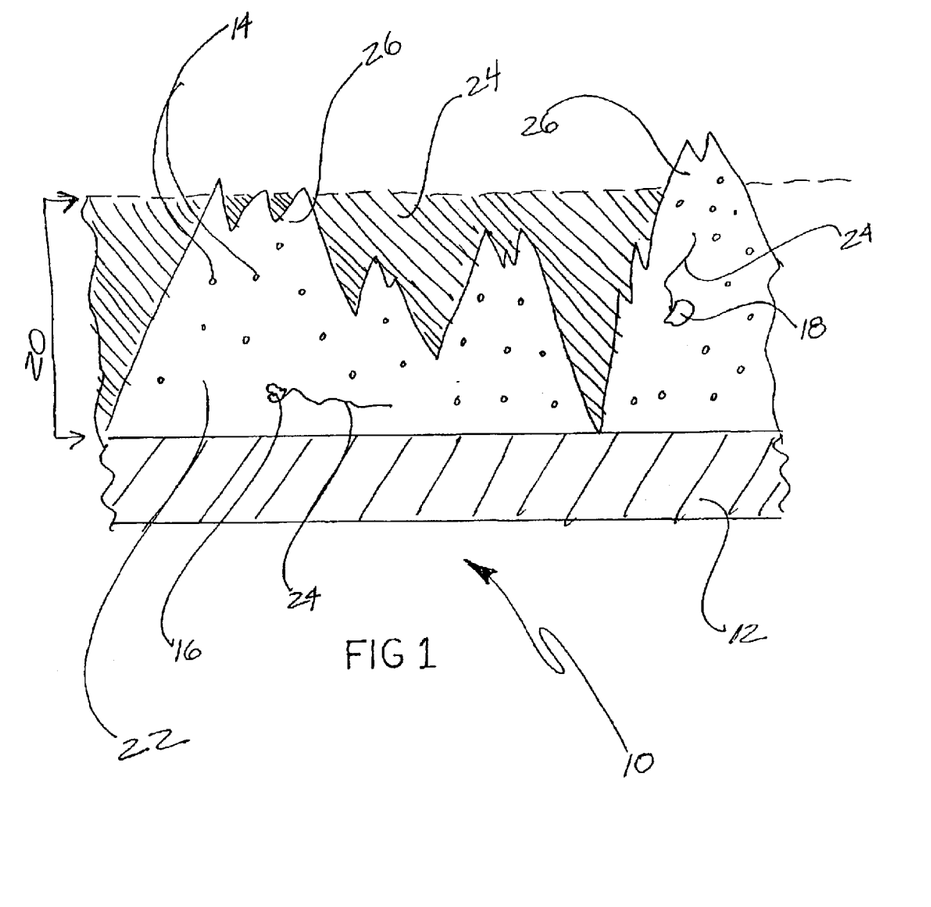
FIG. 1 is a cross-sectional view of a component coated according to the present invention.

A simplified depiction of a typical coated article of the present invention is shown in FIG. 1 and generally denoted by the numeral 10. The figure shows a cross-sectional view of a portion of a generalized plate substrate 12 coated with a cured composite powder composition 20 of the present invention with filler 22 and resin 24. Coating 20 typically has the appearance of mountain tops, spreading at the surface of the substrate, yet maintaining some of the sprayed-on appearance due to the sintering of the coated material without much flow.

Figure 2:
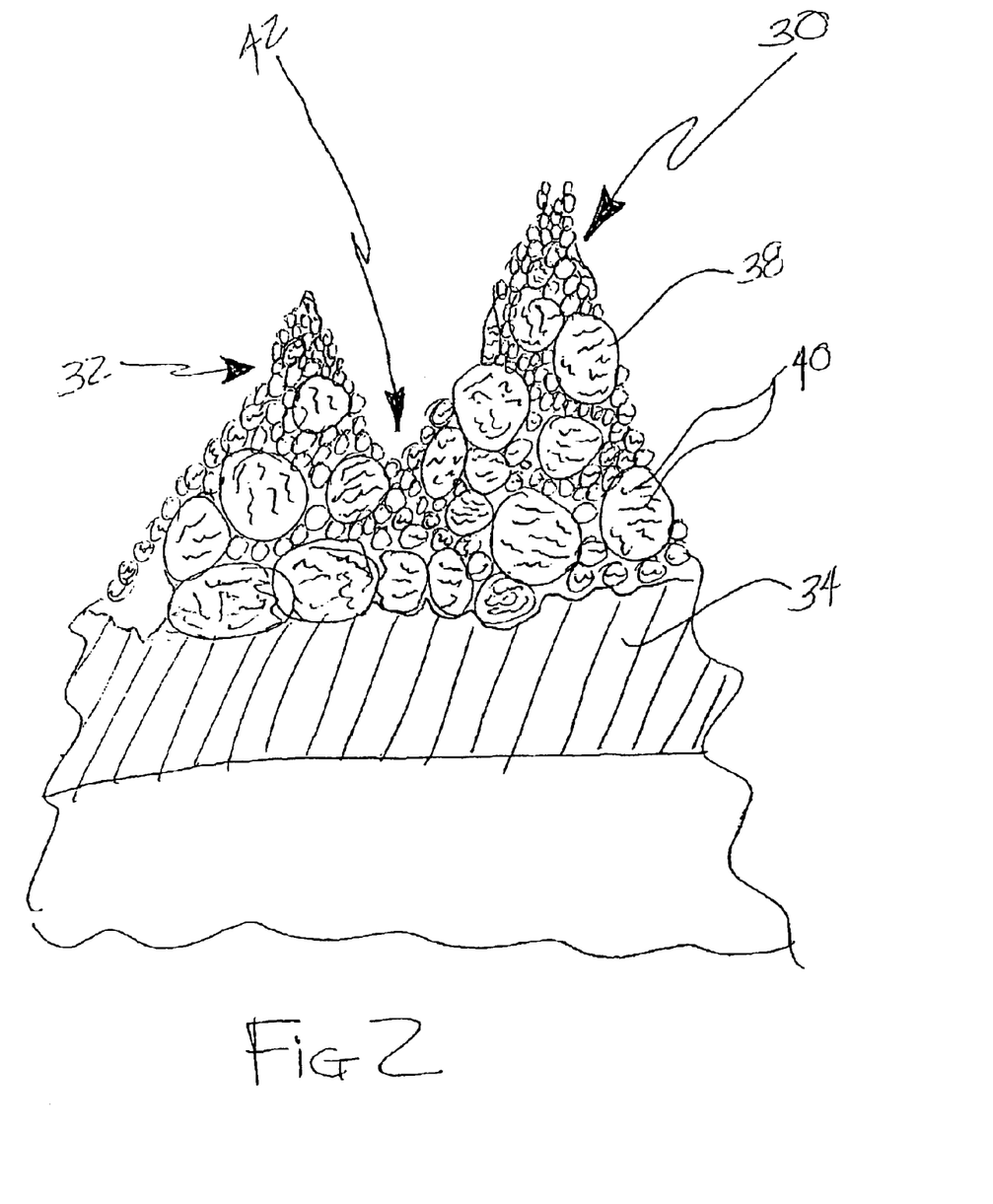
FIG. 2 is a detailed microscopic view of a fresh coating of the abradable coating, showing the peaks and valleys.
Figure 3:
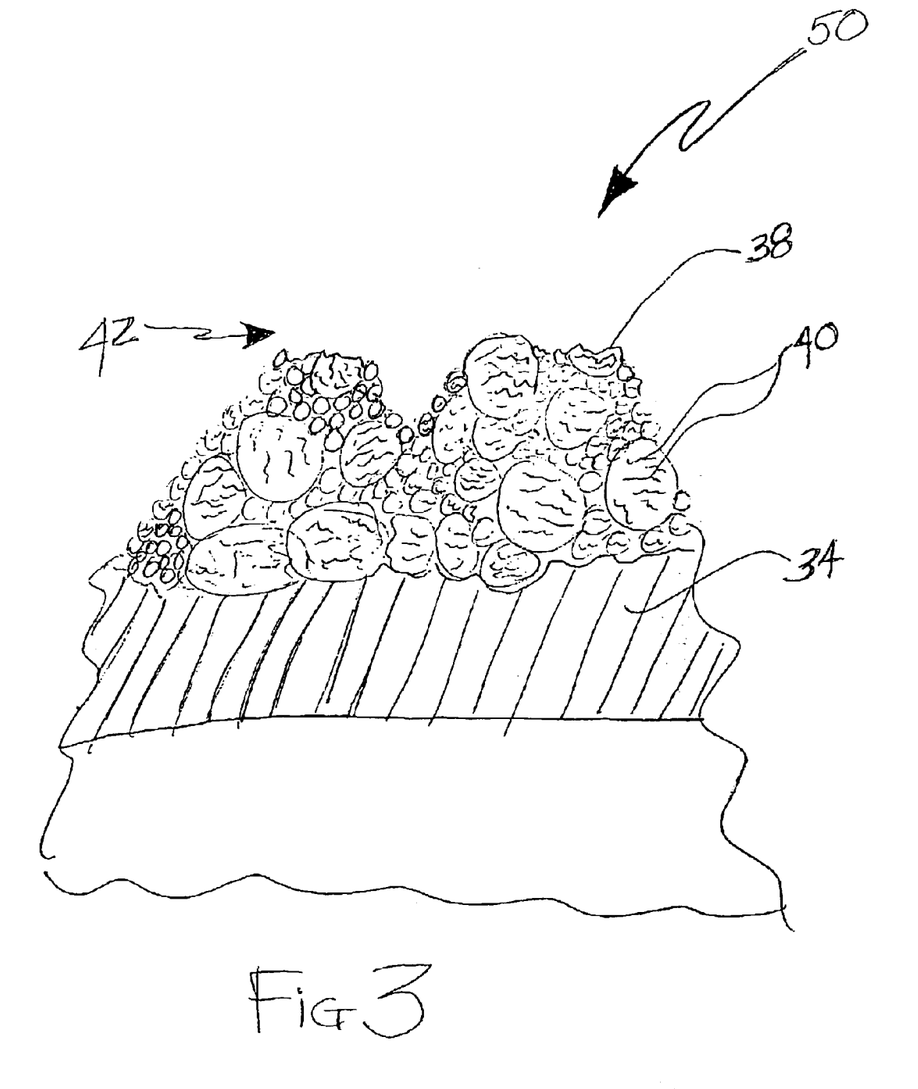
FIG. 3 is a detailed microscopic view of the same abradable coating after it has been run against another surface with the abradable coating, showing the reduced coating height.

Looking next to FIG. 2, there is shown a detail of one of the peaks 26 as illustrated in FIG. 1, where the peaked structure coating is generally denoted by numeral 30, and being made of individual powder granules held together by the resin component at the points where they touch. Each powder particle is a homogeneous composition of the thermoset resin and filler. Filler 40 is shown as lines throughout the bulk of the individual powder granules themselves. Resin 38 is shown having the filler therein, and the entire component rests on substrate 34.

Typical coatings of the present invention exhibit a mass of from about 40 to about 90 percent of the theoretical mass as calculated by geometric mass calculation. This decrease in mass is a further indication of the roughness and porosity of the coatings. More typically, the coatings of the present invention have from about 40 to 80 percent of the theoretical mass and, more typically, from about 50 to about 70 percent.

For example, for a non-porous material, the theoretical maximum density of a coating formed of a 30:70 graphite to resin ratio composition is about 1.46 g/cc. The mass of a 1 m² area of the hypothetical, non-porous cured coating having a 150 μm thickness is calculated by geometric mass calculation as follows:

$$(100 \text{ cm})^2 \times 0.015 \text{ cm} \times 1.46 \text{ g/cm}^3 = 219 \text{ g coating}$$

Typically, a coating formed of the same composition but applied from a liquid formulation, dried, and cured has a density which is about 95% percent of the theoretical density and the coating has a generally smooth surface. Note that the exact density and surface texture depends on the application and curing conditions. The mass of a 1 m² area of the prior art, liquid-applied cured abradable coating having a 150 μm thickness is calculated by geometric mass calculation as follows:

$$(100 \text{ cm})^2 \times 0.015 \text{ cm} \times 0.95 \times 1.46 \text{ g/cm}^3 \times 209 \text{ g coating}$$

It can be seen from the geometric mass calculations that the mass of the exemplary coating formed from the liquid-applied formulation is about 95% of the theoretical mass.

In contrast, for a composite powder composition of the present invention containing graphite and resin in a ratio of 30:70, the coating may, for example, reach 65% theoretical density and have a rough exterior surface. The mass of a 1 m² area of the coating having a thickness of 150 μm is calculated by geometric mass calculation as follows:

$$(100 \text{ cm})^2 \times 0.015 \text{ cm} \times 0.65 \times 1.46 \text{ g/cm}^3 = 142 \text{ g coating}$$

It can be seen from the geometric mass calculations that the mass of the coating of the present invention having a density which is 65% of the theoretical mass. The mass calculations are performed using geometric mass and include the full thickness of the coating because the density of the coating may vary from the interior surface to the exterior surface.

Although from the above-cited examples, it would appear that the present invention utilizes approximately one-half of the weight for a similar coating on a one-square metered area, this belies the fact that in the application of a liquid applied abradable coating as taught by the prior art, approximately 1,200 grams of coating mixture must be used to achieve the coating area and thickness in the example calculation above, and none of the overspray which occurs from the liquid applied abradable coating may be reused, such as with the present invention. Therein lies one of the greatest advantages of the present invention, in which any additional powder composition can be reused and recycled, without any deleterious effects to the coating itself. With the use of a spray, such as described above with regards to the 1,200 grams of coating material, there are two separate sources of losses of material and weight, those being 1) overspray and 2) liquid carrier evaporation. In the prior art method of liquid dipping the abradable coating onto the substrate, less material is lost because there is no overspray; however, the liquid carrier evaporation still accounts for a significant portion of the weight of the coating, as disclosed above wherein the present invention utilizes approximately 150 grams of coating, while the liquid dipped abradable coating utilizes approximately 500 grams of coating, which releases nearly 300 grams of evaporative carrier into the atmosphere. Needless to say, this causes environmental issues and hazards to the health of workers in the nearby vicinity if the liquid carrier contains volatile organic compounds.

The porosity and roughness of the coating presents another advantage to the user, in that less coating material is required to achieve the desired thickness of abradable coating than with prior coatings which are not as porous or rough.

The coatings of the present invention are typically softer than decorative and protective paint coatings. ASTM D-3363. is a test for measuring pencil hardness in which the following scale is used to report the result:

Hardest 6H 5H 4H 3H 2H H F HB B 2B 3B 4B 5B 6B Softest

The coatings of the present invention preferably have a pencil hardness of from about 3H to about 5B as measured using ASTM D-3363. The roughness of the coating being tested should be indicated as a deviation or special condition. More preferably, the coatings of the present invention have a pencil hardness of from about F to about 4B and, most preferably, from about HB to about 3B.

After curing, the device, such as a pump or compressor, may be assembled and operated using the coated components therein. Upon initial operation of the device, the portion of the abradable coating which has an interference fit between mating parts, is worn away to result in an essentially zero clearance during operation of the device. In addition to achieving such a desirable clearance, the coating may be of such a composition that it is self-lubricating, decreasing friction between components within the device or between the coated surface and the fluid passing therethrough.

The industrial applicability of the present invention includes the coating of components in pumps, compressors, medical devices, and in any device which has moving parts. The present invention provides a composition for forming improved abradable coatings, methods of making the improved coatings, improved methods of coating components with abradable coatings, and the improved coated components themselves.

The following examples are illustrative only and should not be construed as limiting the invention which is properly delineated in the appended claims.

EXAMPLES

Example 1

5.055 kg of epoxy resin chips (1000 $\mu$m thick, 1.5 cm diameter or less), 6.813 kg graphite (below 100 $\mu$m size), 0.783 kg polyethylene wax (80 $\mu$m size), and 0.783 kg polypropylene wax (80 $\mu$m size) were mixed in a tumble cement mixer for 3 minutes to form a mixture. The mixture was then ground using a Hosokowa Micron Model 2 TH hammer mill equipped with a 0.020" herring bone screen, at 800 RPM and at a rate of 100 pounds/hour.

5 pounds of the ground mixture was heated to 150–175° F. and fed through a Komarek Grieves roll compactor with a ⅜"×5/32×¼" pellet tooling repeatedly until pellets were formed.

The remainder of the ground mixture was then fed along with previously-formed pellets (about 50:50 volume:volume mixture) into the roll compactor. The ratio of pellets to ground mixture was maintained so that the pellets were strong enough to survive a fall onto concrete from 2 to 3 feet high.

The pellets were then granulated to less than 3 mm diameter using the hammer mill described above but with a 0.25" round screen, at 800 RPM, and 200 to 300 pounds per hour.

0.302 kg epoxy hardener was then mixed with the granulated mixture by tumbling the ingredients in a bag.

The granulated mixture (with hardener) was then extruded through a B&P 19 mm extruder, Model No. MP-2019, with chill rolls at about a rate of 32–35 pounds per hour. The extruder screw operated at 215° F. in Zone 1 and 225° F. in Zone 2, at 500 RPM and a torque of 36–39. The chill roll speed dashpot was 8–9.5 and made a product of 1–3 mm thick. After complete cooling to room temperature, the product was manually broken into chips sized less than 3"×3".

The product chips were then ground using an air classifier mill until the product was less than 100 $\mu$m in size with a median size of approximately 32 $\mu$m.

The ground product was then electrostatically sprayed onto a metal plate using corona-charging electrostatic spray guns until the thickness of the coating was about 200–400 $\mu$m. The coating was then cured by placing the coated substrate in a convection oven set at 400° F. for 10 minutes. This formulation resulted in a Pencil Hardness of HB when cured onto a thin plate substrate. The same formulation resulted in a Pencil Hardness of 2B/3B when cured onto a thick pump rotor. This illustrated the strong influence the cure conditions and thermal history have on the final coating structure and Pencil Hardness achieved with a given formulation.

Examples 2–6

Composite powder compositions were prepared from the following formulations using the method described in Example 1. All of the formulations resulted in good product. All weights are given in kilograms.

| COMPONENT | EXAMPLE # | | | | | |
|---|---|---|---|---|---|---|
| | 1 | 2 | 3 | 4 | 5 | 6 |
| Epoxy resin | 4044 | 4044 | 8500 | 2500 | 2160 | 500 |
| Graphite | 5448 | 5448 | 8200 | 3750 | 3225 | 500 |
| Same powder in cured condition* | | 50% by Weight dry blend | | | | |
| Kaolin | | | 4700 | | | |
| Polyethylene Wax | 626 | 626 | 1379 | | 432 | |
| Polypropylene Wax | 626 | 626 | 1379 | | 228 | |
| Fluoropolymer Wax | | | | 500 | | |
| Epoxy Hardener | 150 | 150 | 500 | 125 | 97 | 25 |
| Pencil Hardness on component | 3H on component | 2B–3B on component | | | | |
| Pencil Hardness on plate | | | H | HB | 2B | 3H |

*Cured composition has the same composition, but cured and in powder form.

The examples herein provide a range of coating hardnesses as measured by Pencil Hardness. This is also known as the widely accepted ASTM D-3363 test. Example 5 provided a Pencil Hardness of 2B, which is relatively easy to scrape or mar with a fingernail. A hardness of 2B works well for applications where fast break-in is required. After break-in, the remaining coating has sufficient strength to provide long-term durability at substantially zero clearance. The results of testing Example 6 yielded a Pencil Hardness of 3H. 3H is relatively difficult to scrape or mar with a fingernail, but will abrade in mechanical applications such as on pump rotors. The break-in time would take longer with the harder Example 6, and long-term durability would be improved for some applications.

Example 1 exhibited a Pencil Hardness of a 3H in a component, which is a relatively hard coating. Example 2 is the same formula as Example 1, except that there is cured powder blended into the uncured powder before/during application to yield a softer coating, as the sintering is controlled because the cured particles cannot melt substantially during heat treatment on the substrate. Example 3 gives a Pencil Hardness of H, and is a result of substituting Kaolin in to replace some of the graphite. Example 4, fluoropolymeric materials, are substituted in for the other polymer waxes, giving a similar hardness with slightly different formulas.

INDUSTRIAL APPLICABILITY

This invention finds applicability on any two contacting work surfaces, but is especially applicable to coating the contacting surfaces on pumps, rotors and gas compressor components. Turbochargers find particular utility.

What is claimed is:

1. A composition for coating onto a surface to form into an abradable coating, comprising:

a homogeneous dry composite powder composition suitable for powder coating an article, said composition formed of a first component, including at least an uncured thermoset resin having a cure temperature, said thermoset resin being selected from the group consisting of acrylic, polyester, epoxy, allyl, melamine formaldehyde, phenolic, polybutadiene, polycarbonate, polydicyclopentadiene, polyamide, polyurethane, and combinations thereof, in combination, with a second filler component, including at least 15 volume percent filler based on the volume of the resultant composite powder composition, wherein the filler is formed of an abradable material selected from the group consisting of metals, silicates, graphite, boron nitride, diamond, molybdenum disulfide, fluorides, clays, wood, ash, pigments, ceramics, polymers, silicon dioxide, titanium dioxide, gypsum, phosphorescent materials, cured resin systems, cured composite powder compositions, and mixtures thereof, which does not substantially melt at or below the cure temperature of the resin, whereby an abradable coating results employing the filler material homogeneously in each of the individual powder particles which makes the coating abradable so that mating surfaces coated with the dry powder composition will abrade against each other and exhibit minimized clearance.

2. The composition according to claim 1, wherein the abradable filler material is employed in an amount of at most about 45 volume percent based on the volume of the resultant composite powder composition.

3. The composition according to claim 1, wherein the abradable filler material is employed in an amount of about 35 volume percent based on the volume of the resultant composite powder composition.

4. The composition according to claim 1, wherein the abradable filler material is employed in an amount of at least about 25 volume percent based on the volume of the resultant composite powder composition.

5. The composition according to claim 1, wherein the dry composite powder composition further contains a polymeric material selected from the group consisting of polymers, non-activated thermoset resin, thermoplastics and polymer waxes.

6. The composition according to claim 5, wherein the powder composition further contains a polymer wax selected from the group consisting of fluoroplastic wax, polyethylene wax and polypropylene wax.

7. The composition according to claim 1 further comprising additional solid powders blended in with the composite powder.

8. A composition for coating onto a surface to form into an abradable coating, comprising:

a homogeneous dry composite powder composition formed of a first component, including an uncured thermoset resin having a cure temperature, wherein the thermoset resin is selected from the group consisting of acrylic, polyester, epoxy, allyl, melamine formaldehyde, phenolic, polybutadiene, polycarbonate, polydicyclopentadiene, polyamide, polyurethane, and combinations thereof, in combination with a second filler component, including at least 15 volume percent filler based on the volume of the resultant composite powder composition, wherein the filler is formed of an abradable material which does not substantially melt at or below the cure temperature of the resin, and wherein the filler is selected from the group consisting of metals, minerals and mineral substances having MOH's hardnesses, of between 0 and 10, silicates, graphite, boron nitride, diamond, molybdenum disulfide, fluorides, clays, wood, ash, pigments, ceramics, polymers, silicon dioxide, titanium dioxide, gypsum, phosphorescent materials, cured resin systems, cured composite powder compositions, and mixtures thereof, whereby an abradable coating results employing the filler homogeneously in each of the individual powder particles which makes the coating abradable so that mating surfaces coated with the powder composition will abrade against each other and exhibit minimized clearance.

9. The composition according to claim 8 further comprising additional solid powders blended in with the composite powder.

10. A composition for coating onto a surface to form into an abradable coating, comprising:

a homogeneous dry composite powder composition formed of a first component, including an uncured thermoset resin having a cure temperature, wherein the thermoset resin is selected from the group consisting of acrylic, polyester, epoxy, allyl, melamine formaldehyde, phenolic, polybutadiene, polycarbonate, polydicyclopentadiene, polyamide, polyurethane, and combinations thereof, in combination with a second filler component, including at least 15 volume percent filler based on the volume of the resultant composite powder composition, wherein the filler is formed of a material which does not substantially melt at or below the cure temperature of the resin, and wherein the filler is selected from the group consisting of metals, minerals and mineral substances having MOH's hardnesses of between 0 and 10, silicates, graphite, boron nitride, diamond, molybdenum disulfide, fluorides, clays, wood, ash, pigments, ceramics, polymers, silicon dioxide, titanium dioxide, gypsum, phosphorescent materials, cured resin systems, cured composite powder compositions, and mixtures thereof; and in further combination with a third component of a polymeric material selected from the group consisting of polymers, non-activated thermoset resin, thermoplastics and polymer waxes selected from the group consisting of fluoroplastic wax, polyethylene wax and polypropylene wax, whereby an abradable coating results employing the filler which makes the coating abradable on mating surfaces which will abrade against each other and exhibit minimized clearance.

11. The composition according to claim 10 further comprising additional solid powders blended in with the composite powder.

12. A method of making a composition for coating a surface with a coating curable into an abradable coating, comprising:

melt-mixing an evaporative carrier-free mixture of a dry powder thermoset resin having a cure temperature, and at least 15 volume percent of an abradable filler material which does not substantially melt at or below the cure temperature of the resin, and wherein the filler is selected from the croup consisting of metals, minerals and mineral substances having MOH's hardnesses of between 0 and 10, silicates, graphite, boron nitride, diamond, molybdenum disulfide, fluorides, clays, wood, ash, pigments, ceramics, polymers, silicon dioxide, titanium dioxide, gypsum, phosphorescent materials, cured resin systems, cured composite powder compositions, and mixtures thereof, based on the volume of the resultant composite powder composition, to form an abradable homogeneous mass composite;

cooling the mass composite; and breaking the cooled mass composite into powder particles, thereby forming the homogeneous dry composite powder composition.

13. The method according to claim 12, further comprising consolidating the resin and the abradable material together into small units before the melt-mixing step.

14. The method according to claim 12, further comprising:

consolidating the resin and the abradable filler material together into small units; and mixing a hardener with the small units before the melt-mixing step.

15. The method according to claim 12, wherein the resin is selected from the group consisting of acrylic, polyester, epoxy, allyl, melamine formaldehyde, phenolic, polybutadiene, polycarbonate, polydicyclopentadiene, polyamide, polyurethane, silicone, and combinations thereof.

16. The method according to claim 12, wherein the abradable filler material is employed in an amount of at most about 45 volume percent based on the volume of the composite powder composition.

17. The method according to claim 12, wherein the abradable filler material is employed in an amount of about 35 volume percent based on the volume of the composite powder composition.

18. The method according to claim 12, wherein the abradable filler material is employed in an amount of at least about 25 volume percent based on the volume of the composite powder composition.

19. The method according to claim 12, wherein the abradable filler material is formed of a material selected from the group consisting of metals, minerals and mineral substances having MOH's hardnesses of between 0 and 10, silicates, graphite, diamond, molybdenum disulfide, fluorides, clays, wood, ash, pigments, ceramics, polymers, silicon dioxide, titanium dioxide, gypsum, phosphorescent materials, cured resin systems, cured composite powder compositions and mixtures thereof.

20. A method of making a composition for coating a surface with a coating curable into an abradable coating, comprising:

consolidating an evaporative carrier-free mixture of a dry powder thermoset resin having a cure temperature, wherein the resin is selected from the group consisting of acrylic, polyester, epoxy, allyl, melamine formaldehyde, phenolic, polybutadiene, polycarbonate, polydicyclopentadiene, polyamide, polyurethane, silicone, and combinations thereof, with at least 15 volume percent of an abradable filler material, based on the volume of the resultant composite powder composition, wherein the abradable filler material is formed of a material which does not substantially melt at or below the cure temperature of the resin, and wherein the abradable filler material is formed of a material selected from the group consisting of metals, minerals and mineral substances having MOH's hardnesses of between 0 and 10, silicates, graphite, diamond, molybdenum disulfide, fluorides, clays, wood, ash, pigments, ceramics, polymers, silicon dioxide, titanium dioxide, gypsum, phosphorescent materials, cured resin systems, cured composite powder compositions and mixtures thereof, to form small consolidated units of a mass composite;

melt-mixing the small consolidated units of a mass composite;

cooling the mass composite; and breaking the cooled mass composite into powder particles, thereby forming the homogeneous composite powder composition.

21. A method of making a composition for coating a surface with a coating curable into an abradable coating, comprising:

consolidating an evaporative carrier-free mixture of a dry powder thermoset resin having a cure temperature, wherein the resin is selected from the group consisting of acrylic, polyester, epoxy, allyl, melamine formaldehyde, phenolic, polybutadiene, polycarbonate, polydicyclopentadiene, polyamide, polyurethane, silicone, and combinations thereof, together with at least 15 volume percent of a abradable filler material, said volume percent being based on the volume of the resultant composition, wherein the abradable filler material is formed of a material which does not substantially melt at or below the cure temperature of the resin, and wherein the abradable filler material is formed of a material selected from the group consisting of metals, minerals and mineral substances having MOH's hardnesses of between 0 and 10, silicates, graphite, diamond, molybdenum disulfide, fluorides, clays, wood, ash, pigments, ceramics, polymers, silicon dioxide, titanium dioxide, gypsum, phosphorescent materials, cured resin systems, cured composite powder compositions and mixtures thereof, to form a consolidated resin-filler composition of small units;

melt mixing the small units of consolidated resin and abradable filler material composition to form a homogeneous mass composite;

cooling the mass composite; and breaking the cooled mass composite into powder particles, thereby forming a homogeneous composite powder composition suitable for use as a powder coat abradable coating.

22. The method according to claim 21, further comprising:

consolidating the resin and the abradable filler material together into small units; and mixing a hardener with the small units before the melt-mixing step.

23. A method of coating an article with an abradable coating, comprising:

applying, to a surface of the article, a homogeneous dry composite powder composition containing a powder mixture of a thermoset resin having a cure temperature and at least 15 volume percent of abradable filler material, based on the volume of the composite powder composition, said composition being formed of a first thermoset resin component, including at least an uncured thermoset resin having a cure temperature, said thermoset resin being selected from the group consisting of acrylic, polyester, epoxy, allyl, melamine formaldehyde, phenolic, polybutadiene, polycarbonate, polydicyclopentadiene, polyamide, polyurethane, and combinations thereof, in combination with a second filler component, including at least 15 volume percent filler based on the volume of the resultant composite powder composition, wherein the filler is formed of an abradable material selected from the group consisting of metals, silicates, graphite, boron nitride, diamond, molybdenum disulfide, fluorides, clays, wood, ash, pigments, ceramics, polymers, silicon dioxide, titanium dioxide, gypsum, phosphorescent materials, cured resin systems, cured composite powder compositions, and mixtures thereof, which does not substantially melt at or below the cure temperature of the resin, whereby an abradable coating results employing the filler material homogeneously in each of the individual powder particles which makes the coating abradable so that mating surfaces coated with the dry powder composition will abrade against each other and exhibit minimized running clearances after an initial break-in period; and curing the applied composite powder composition.

24. The method according to claim 23, wherein the resin is selected from the group consisting of acrylic, polyester, epoxy, allyl, melamine formaldehyde, phenolic, polybutadiene, polycarbonate, polydicyclopentadiene, polyamide, polyurethane, silicone, and combinations thereof.

25. The method according to claim 23, wherein the abradable filler material is employed in an amount of at most about 45 volume percent based on the volume of the composite powder composition.

26. The method according to claim 22, wherein the abradable filler material is employed in an amount of about 35 volume percent based on the volume of the composite powder composition.

27. The method according to claim 23, wherein the abradable filler material is employed in an amount of at least about 25 volume percent based on the volume of the composite powder composition.

28. The method according to claim 23, wherein the abradable filler material is formed of a material selected from the group consisting of metals, minerals and mineral substances having MOH's hardnesses of between 0 and 10, silicates, graphite, diamond, molybdenum disulfide, fluorides, clays, wood, ash, pigments, ceramics, polymers, silicon dioxide, titanium dioxide, gypsum, phosphorescent materials, cured resin systems, cured composite powder compositions and mixtures thereof.

29. The method according to claim 23 wherein the homogeneous dry composite powder composition comprises additional solid powder blended therein.

30. An article coated with an abradable coating, comprising:

a substrate; and a homogeneous dry powder coating on a surface of the substrate, the coating being formed of a thermoset resin having a cure temperature and at least 15 volume percent abradable filler material based on the volume of the coating, wherein the abradable filler material is formed of a material which does not melt substantially at or below the cure temperature of the resin, the coating having a structure such that the coating has from about 40 to about $^{90}$% mass of its geometrically theoretically calculated mass, and wherein the coating has a pencil hardness of from about 2H to about 5B according to ASTM D-3363.

31. The article according to claim 30, wherein the resin is selected from the group consisting of acrylic, polyester, epoxy, allyl, melamine formaldehyde, phenolic, polybutadiene, polycarbonate, polydicyclopentadiene, polyamide, polyurethane, silicone, and combinations thereof.

32. The article according to claim 30, wherein the abradable filler material is employed in an amount of at most about 45 volume percent based on the volume of the composite powder composition.

33. The article according to claim 30, wherein the abradable filler material is employed in an amount of at most about 40 volume percent based on the volume of the composite powder composition.

34. The article according to claim 30, wherein the abradable filler material is employed in an amount of at least about 30 volume percent based on the volume of the composite powder composition.

35. The article according to claim 30, wherein the abradable filler material is selected from the group consisting of metals, minerals and mineral substances having MOH's hardnesses of between 0 and 10, silicates, graphite, diamond, molybdenum disulfide, fluorides, clays, wood, ash, pigments, ceramics, polymers, silicon dioxide, titanium dioxide, gypsum, phosphorescent materials, cured resin systems, cured composite powder compositions and mixtures thereof.

36. The article according to claim 30, wherein the powder further contains a polymeric material selected from the group consisting of polymers, non-activated thermoset resin, thermoplastics and polymer waxes.

37. The article according to claim 36, wherein the powder further contains a polymer wax selected from the group consisting of fluoroplastic wax, polyethylene wax and polypropylene wax.

38. The article according to claim 30, wherein the coating has a pencil hardness of from about F to about 4B according to ASTM D-3363.

39. The article according to claim 30, wherein the coating has a pencil hardness of from about 3B according to ASTM D3363.

40. The article according to claim 30 where the homogeneous dry composite powder comprises additional solid powder blended therein.

* * * * *